United States Patent
Metzger et al.

(10) Patent No.: US 9,360,362 B2
(45) Date of Patent: Jun. 7, 2016

(54) FORCE-MEASURING DEVICE WITH SLIDING WEIGHT

(71) Applicant: Mettler-Toledo AG, Greifensee (CH)

(72) Inventors: Andreas Metzger, Männedorf (CH); Stephan Baltisberger, Gossau (CH); Hans-Rudolf Burkhard, Wila (CH)

(73) Assignee: Mettler-Toledo GmbH, Greifensee (CH)

( * ) Notice: Subject to any disclaimer, the term of this patent is extended or adjusted under 35 U.S.C. 154(b) by 314 days.

(21) Appl. No.: 13/946,215

(22) Filed: Jul. 19, 2013

(65) Prior Publication Data

US 2014/0020960 A1 Jan. 23, 2014

(30) Foreign Application Priority Data

Jul. 23, 2012 (EP) .................................... 12177470

(51) Int. Cl.
| | | |
|---|---|---|
| *G01G 1/18* | (2006.01) | |
| *G01G 7/02* | (2006.01) | |
| *G01G 21/24* | (2006.01) | |
| *G01G 21/26* | (2006.01) | |
| *G01G 23/16* | (2006.01) | |

(52) U.S. Cl.
CPC .. *G01G 1/18* (2013.01); *G01G 7/02* (2013.01); *G01G 21/24* (2013.01); *G01G 21/26* (2013.01); *G01G 23/16* (2013.01)

(58) Field of Classification Search
CPC ............. G01G 1/18; G01G 1/28; G01G 1/29; G01G 7/02; G01G 7/04; G01G 21/24; G01G 21/26; G01G 23/16
See application file for complete search history.

(56) References Cited

U.S. PATENT DOCUMENTS

| | | | | |
|---|---|---|---|---|
| 3,887,797 A | * | 6/1975 | Nishiguchi | 702/87 |
| 4,100,985 A | * | 7/1978 | Meier | 177/189 |
| 4,153,124 A | * | 5/1979 | Knothe et al. | 177/210 EM |
| 4,165,791 A | * | 8/1979 | Smith | 177/212 |
| 4,354,563 A | * | 10/1982 | Luchinger et al. | 177/212 |
| 4,656,599 A | * | 4/1987 | Knothe et al. | 702/173 |
| 4,722,409 A | * | 2/1988 | Kunz | 177/212 |
| 4,802,541 A | * | 2/1989 | Bator et al. | 177/212 |
| 4,825,968 A | * | 5/1989 | Maaz et al. | 177/212 |
| 5,092,416 A | * | 3/1992 | Luechinger et al. | 177/229 |

(Continued)

FOREIGN PATENT DOCUMENTS

| | | |
|---|---|---|
| DE | 2803978 A1 | 3/1979 |
| GB | 2000305 A | 1/1979 |

*Primary Examiner* — Peter Macchiarolo
*Assistant Examiner* — Natalie Huls
(74) *Attorney, Agent, or Firm* — Standley Law Group LLP

(57) ABSTRACT

A force-measuring device (1) for a gravimetric measuring instrument has a stationary part (11) and a load-receiving part (12). Parallel guide members (14, 15) connect the receiving parts. The device also has at least one balance beam (19) connected to the load-receiving part through a coupling element (17) acting on a first lever arm (18) thereof, and which, at a second lever arm (20) thereof, is connected to a measurement transducer (22) which is arranged on the stationary part. Further levers (29, 30) can be arranged, respectively, between the first lever arm and the load-receiving part, and between the second lever arm and the measurement transducer. At least one sliding weight (23, 23A, 23B) is arranged on the at least one balance beam, wherein the position of each of the sliding weights present can be varied in a controlled way by means of at least one drive mechanism.

18 Claims, 10 Drawing Sheets

(56) References Cited

U.S. PATENT DOCUMENTS

| | | | |
|---|---|---|---|
| 5,644,492 A * | 7/1997 | Reichmuth et al. | 705/415 |
| 7,416,119 B1 * | 8/2008 | Inderrieden | 235/383 |
| 7,780,579 B2 * | 8/2010 | Mueller et al. | 482/62 |
| 9,086,315 B2 * | 7/2015 | Metzger et al. | |
| 2008/0053249 A1 * | 3/2008 | Reber et al. | 73/862.69 |
| 2011/0147099 A1 * | 6/2011 | Burkhard et al. | 177/246 |

* cited by examiner

US 9,360,362 B2

FORCE-MEASURING DEVICE WITH SLIDING WEIGHT

CROSS-REFERENCE TO RELATED APPLICATIONS

This application is entitled to benefit of a right of priority under 35 USC §119 from European patent application 12177470.7, filed 23 Jul. 2012, the content of which is incorporated by reference as if fully recited herein.

TECHNICAL FIELD

The invention concerns a force-measuring device for a gravimetric measuring instrument with a sliding weight that is arranged on the balance beam and is slidable along the latter.

BACKGROUND

In weighing cells that function according to the principle of electromagnetic force compensation and which are also referred to as magnetic force restoration ("MFR") weighing cells, the weight force of the weighing object is transferred either directly or by way of one or more force-transmitting levers to an electromechanical measurement transducer which generates a compensation force corresponding to the weight force of the weighing object and at the same time delivers an electrical signal which is further processed by an electronic weighing module in the processor unit and indicated on a display panel.

In a MFR weighing cell, the weight force of the weighing object is measured by way of an electrical substitute quantity. For a variety of technical reasons, this measurement is subject to inaccuracies, and the relative measurement resolution of a MFR weighing cell is therefore limited. A MFR weighing cell is further limited in its relative measurement resolution because it has a balance beam which can be caused to resonate to a greater or lesser degree by ground vibrations. Such vibrations can manifest themselves in the weighing signal as disturbances of a kind that cannot be compensated.

According to a known concept of the state of the art which is used in high-resolution force-measuring devices such as, e.g. mass comparators, the limits of the high-resolution range which are inherent in the electrical measurement process are shifted in discrete steps by initially overloading the balance beam on the side of the compensation force, i.e. the side of the measurement transducer and then adding so-called substitution weights to the opposite side, i.e. the side of the pan hanger, in order to establish equilibrium. The function of these substitution weights is to shift the measurement window of the force-measuring device which, in the absence of substitution weights, would be confined between a minimum- and a maximum weighing load, wherein the shifting of the measurement window occurs in discrete amounts equal to the values of the substitution weights. Force-measuring devices of this type are also referred to as window-comparator weighing cells, and state-of-the-art embodiments are described, for example, in DE 2, 621,483 B1, which has an equivalent in U.S. Pat. No. 4,153,124.

Within the realm of gravimetric measuring instruments with electromagnetic force compensation, the measurement window of a force-measuring device is the weight range within which the mass of the weighing object can be measured by varying the compensation force of the measurement transducer. The width of this weight range is thus defined and limited by the maximum compensation force that can be generated by the measurement transducer (the stronger the compensation force of a measurement transducer, the wider the measurement window).

A balance disclosed in U.S. Pat. No. 4,165,791 illustrates how the mechanical zero point, and with it the measurement window, can be shifted in a force-measuring device. In the process of measuring an unknown weight, all of the substitution weights are at first resting on the pan hanger, and the equilibrium in this initial zero position of the balance is maintained by a counterweight. After the weighing object has been set on the balance, an amount of weight that is just short of the weight of the weighing object is removed from the balance hanger. The remaining imbalance is compensated by an electromagnetic coil. This concept has the disadvantage that the balance beam permanently carries a large amount of mass, which reduces the mechanical stability of the weighing cell against ground vibrations, in particular against rotatory resonances. As a way of reducing the complexity of the design, the number of substitution weights in a balance of the kind disclosed in U.S. Pat. No. 4,165,791 is kept to a minimum. This has the consequence that the measurement window can only be shifted in large jumps.

In a balance disclosed in DE 2 803 978 A1, the total effect of all weights that are suspended from the scale mechanism is compensated by a counterweight which is arranged to the coil lever at the opposite end of where the pan hanger is attached. Taking into account the lever ratio of the coil lever, the counterweight is designed to hold equilibrium with the largest weight that can be measured on the balance, with the dead weight of the pan carrier and the weighing pan included. The counterweight is set in place after the final assembly of the weighing cell, and the final adjustment of the weighing mechanism is performed by means of an adjustment screw. After the counterweight has been adjusted in this manner, it is normally locked in place and sealed by the manufacturer, for example with a drop of thread-locking adhesive, to prevent the counterweight from coming loose or being moved.

The mechanical zero point is the operating point of a force-measuring device where the balance beam is in equilibrium without a compensation force acting on it. This is the condition where the measurement error of the electrical measurement quantity is smallest, meaning that the force-measuring device has its highest measurement resolution around this point. Furthermore, at this operating point the force-measuring device is insensitive to vertically directed ground disturbances.

According to a solution that is disclosed in DE 103 42 272 B3 (an equivalent is found in U.S. Pat. No. 7,780,579), wherein a dead load is compensated by a counterweight, the resonance tendencies of the transmission lever are minimized by arranging the counterweight so that alternating coil forces are not acting in a way that excites oscillations. This is achieved by placing the counterweight at a location above the coil. Thus, by establishing a standing-wave node within the coil, the tendency to excite the transmission lever into resonance is removed. The counterweight is in this case of a fixed amount, designed to counterbalance the dead load, i.e. the weighing pan, with no provisions to allow for a change in the dead load, for example to take a container into account as additional dead load.

A balance with a sliding weight is shown in GB 2 000 305 A. However, this balance is not based on the operating principle of electromagnetic force compensation, but uses the sliding weight as a means of weighing an object placed on the balance pan. An equilibrium detector consisting of a flexible leaf carrying four strain gauges measures the deflection of the balance beam. In response to the measured deflection, an electrical spindle drive mechanism moves the sliding weight along the balance beam in order to restore the equilibrium of the balance beam. The revolutions of the spindle are picked up with a decoder to determine the position of the sliding weight. Finally the weight of the object is calculated based on the position of the sliding weight.

The present invention has the objective to provide a force-measuring device in which the mechanical zero point and the measurement window can be adapted automatically and with continuous variability to the requirements of the load that needs to be measured, while keeping the applied load on the balance beam to a minimum.

SUMMARY

According to the invention, this task is solved with a force-measuring device for a gravimetric measuring instrument, wherein the force-measuring device operates according to the principle of electromagnetic force compensation and has a stationary part and a load-receiving part connected to each other by parallel guide members. The force-measuring device further includes at least one balance beam with a first lever arm that is connected to the load-receiving part by way of a coupling element mer, and with a second lever arm carrying a measurement transducer which is arranged on the stationary part, wherein the measurement transducer is an electromagnetic coil connected to the second lever arm for guided movement in the air gap of a permanent magnet. Further additional levers can be arranged between the first lever arm and the load-receiving part and/or between the second lever arm and the measurement transducer. Arranged on the at least one balance beam is at least one sliding weight, wherein the position of the sliding weight can be varied in a controlled way by means of a drive mechanism based on a measurement variable of the measurement transducer and/or of a position-measuring device cooperating with the measurement transducer.

The invention provides a way to expand the weighing range. The weighing range of a force-measuring device is defined as the range in which the mass of the weighing object can be measured. Changing the position of a sliding weight thus means shifting the measurement window. In addition, the mechanical zero point can be precisely centered on the operating point in order to make optimal use of the measurement window. This has the advantage that the best possible measurement resolution of the force-measuring device can be achieved at any operating point.

If the tare is cancelled out at this operating point and if the loads to be weighed are small, which is often the case with micro-weighing cells, the force-measuring device according to the invention can always be advantageously operated near the point that ensures optimal immunity against falling into resonance with vertically directed ground vibrations, i.e. at the mechanical zero point.

Instead of using substitution weights and a counterweight which necessitate a stable, rigid, and therefore massive construction of the lever, the mechanical zero point and the measurement window can now be adapted to the needs of a given application through a stepless adjustment by moving the sliding weight along the balance beam.

This type of force-measuring device is used with preference to weigh materials in a container, as the preload represented by the container decreases the effective weighing range, i.e. reduces the remaining measurement window. The preload, also referred to as tare load, is the portion of the weighing load that is of no interest in the weight measurement but cannot be separated from the actual weighing object. The sliding weight has the function to compensate for the preload, so that the entire measurement window is made available again for the weighing of the actual weighing object.

The invention is suitable for mass comparators or force-measuring devices of a microbalance as they are often used in situations where it is desirable to set tare at the optimal operating point, because a measurement of the weight force at an operating point near the mechanical zero point offers optimum stability against resonance excited by vertically directed ground vibrations.

In dynamic checkweighing scales, products or weighing objects are weighed while moving on a conveyor belt. This involves an arrangement where a conveyor belt is mounted on a force-measuring device which receives the combined weight force of the conveyor belt and the weighing object. In check-weighing scales of a contemporary design, the mass of the conveyor belt is compensated by a counterforce, for example a counterweight. The arrival of a weighing object on the conveyor belt as well as the discharge of the object from the belt cause oscillatory disturbances in the check-weighing scale which introduce errors into the weighing result, or else make it necessary to reduce the number of weighings per unit of time in order to obtain a more accurate weighing result. With a force-measuring device according to the invention with bidirectional ("push-pull") force compensation, the operating point, i.e. the mechanical zero point, can be adapted to the objects being weighed, and if the device is equipped with more than one sliding weight, it is also possible to adjust the inertial mass associated with the counterforce or counter weight to the inertial mass of the load-receiving portion of the system (including the weighing object). This minimizes the vulnerability to oscillatory disturbances and increases the possible number of weighings per unit of time. This adaptability represents an advantage because it allows the dynamic check-weighing scale to be used in different production lines or for different products or weighing objects.

As a further advantageous consequence of the invention, different preloads, conveyor belts or weighing conveyors can be combined with force-measuring devices of one and the same type. This simplifies the assortment of modular component elements for a dynamic checkweighing scale.

The invention can be used in force-measuring devices with measurement transducers operating only in a push-direction as well as transducers generating a push-pull compensation force. The difference lies in the directionality of the compensation force. A push system can generate only a unidirectional compensation force, while a push-pull system is capable of generating a bidirectional compensation force. The latter system requires the mass of the second lever arm to be suitably adapted, which can be accomplished with a supplementary weight, or to reduce the mass of the first lever or of the load-receiving part. As a result, a push-pull system always has its mechanical zero point positioned within the measurement window, and this property, in turn, improves the accuracy of the force-measuring device. Especially in the case of a symmetrical push-pull system, the mechanical zero point lies at the midpoint of the measurement window.

The compensation of the preload in accordance with the present invention will now be explained more specifically through an example which concerns the setting of a target value for dispensing a specified amount of substance (as will be described in detail in the context of FIG. 10).

In a MFR weighing cell, the deviation from equilibrium is detected by a position sensor and evaluated by a controller device. A processor unit regulates the current for the measurement transducer (typically configured as a coil) so that the latter generates a compensating force which acts as a counterbalancing force to the weight force of the weighing object. In order for this equilibrium regulation to work well in a push system, a small amount of current always needs to be flowing through the measurement transducer, which means that the compensation force of the sliding weight always has to be somewhat smaller than the weight force of the weighing object. The sliding weight is therefore not moved up to the exact equilibrium position, so that there is a remaining amount of compensation force to be generated by the measurement transducer. This is also a prerequisite for a precise measurement. The remaining partial amount of compensation force which is contributed by the measurement transducer represents about 2% to 8% of the total compensation force. In a push-pull system, on the other hand, the total compensation force can be supplied by the sliding weight.

The term "balance beam" as used in the context of this invention is used to distinguish the lever on which at least one sliding weight is arranged. In an arrangement with several levers, this can be any lever that appears suitable for the purpose. It is also possible to arrange sliding weights on more than one lever. Depending on the design choices for the lever-reduction system, the lever that is used as balance beam, and of course the sliding weights, a larger or smaller amount of compensation force can be produced by the sliding weight. In an advantageous design configuration two levers perform the function of balance beams, so that one balance beam can be used for a coarse adjustment and the other balance beam for a fine adjustment. The weight of the measurement transducer itself, in particular the coil of a MFR weighing cell, should also be taken into account and should preferably be acting in opposition to the weight force on weighing pan.

Further developed embodiments of the invention are envisioned wherein by shifting the position of the sliding weight, the position of the measurement window of the force-measuring device can be changed, and/or a load acting on the load-receiving part can be compensated, and/or the buoyant force of a load acting on the load-receiving part can be compensated, and/or the sensitivity to rotatory oscillations can be partially or fully compensated.

According to an advantageous embodiment of the invention, the position of the sliding weight can be varied in a controlled way based on the measurement variable of the measurement transducer and/or of a position-measuring device cooperating with the measurement transducer.

According to one embodiment of the invention, the measurement transducer is configured as an electrical coil, wherein the current flowing through the electromagnetic coil and generating the compensation force represents the measurement variable that is used to set the position of the sliding weight. This measurement variable can be used directly as the controlling variable for the position of the sliding weight after the operating point has been brought inside the measurement window.

In a further embodiment of the invention, the position-measuring device is an optoelectronic position sensor with a light emitter and a light receiver arranged on the stationary part and facing each other across a space interval, further with a shutter vane that cuts through the space interval and participates in the excursions of the movable part, wherein the signal of the position sensor corresponds to a displacement of the interconnected movable parts of the balance from a zero position which occurs as a result of placing the load on the load receiver, and wherein the position sensor signal represents the measurement variable for setting the position of the sliding weight.

In a particularly advantageous development of the invention, a travel-measuring device is used to record the position of the sliding weight and store it in a memory of a processor unit as a position setting, a preload-compensation setting, a buoyancy-compensation setting and/or as a compensation setting for rotatory vibrations, for example in the form of a table or graph, for retrieval at a later point in time. This has the advantage that for example the data of a plurality of weighing receptacles can be stored in a database, saving time in the dosage-dispensing process.

In another advantageous embodiment of the invention, the processor unit of the force-measuring device has the capability to identify a receptacle from a bar code or an RFID chip by means of a reader device that is arranged on the load-receiving part or connected to the gravimetric measuring instrument, and to recall the stored data associated with the receptacle for the setting of the at least one sliding weight, i.e. the position setting, preload-compensation setting, buoyancy-compensation setting and/or compensation setting for rotatory vibrations. Thus, the setting of the target value can be automated and the probability of an operator error can be minimized.

The inventive concept is used with special preference in applications where the weighing receptacles are changed frequently. The position of the at least one sliding weight can be stored in a memory, so that in a later measurement with the same receptacle, the same preload setting can be repeated by moving the sliding weight into the same position.

The data needed by the processor unit for the positioning of the sliding weights to compensate for a preload and/or for a buoyancy force and/or for a dynamic rotation behavior are stored in a memory of the processor unit for the sliding weights individually as well as for their positions relative to each other and covering all positions of their slide paths, so that the same settings can be repeated at a later point in time. Thus, the user of the operating unit only needs to enter a weight value into the processor unit in order for the latter to perform the compensation of a preload and/or a buoyancy force and/or a dynamic rotation behavior.

According to an advantageous embodiment of the invention, the center of mass of the at least one sliding weight is located in the plane of neutral equilibrium, and the sliding weight is constrained to move along this plane.

If the axis of rotation, the center of mass of the balance beam (inclusive of the coil, but without the sliding weights), the connection between the first lever arm and the coupling element, and the center of force generation of the measurement transducer all lie in one common plane and as long as no load is placed on the weighing pan, the balance beam is not subjected to any moments and always in equilibrium, independent of an out-of-level condition of the balance. The common plane is referred to as the plane of neutral equilibrium.

According to another aspect of the invention, at least two sliding weights are arranged on the balance beam at locations within the plane of neutral equilibrium and movable independently of each other within said plane. By using two smaller sliding weights which are equivalent in their sum to the single sliding weight mentioned earlier, the optimum operating point as well as the position of the measurement window relative to the operating point can be better adapted to the intended measurement process. In particular, this arrangement makes it possible to adapt the inertial mass or the density (as will be explained in the detailed description) on the side of the measurement transducer (i.e. the second lever arm) to the inertial mass or the density on the side of the load-receiving part (i.e. the first lever arm).

According to a particularly advantageous development of the invention, the at least two sliding weights have different respective densities and/or are configured to be exchangeable. Thus, not only the mass but also the density of the bodies on the transducer side of the balance beam (second lever arm) can be adapted to the mass and density of the bodies on the load-receiver side (first lever arm). The exchangeable sliding weights have the advantage that the force-measuring device can be adapted to the weighing tasks.

A preferred embodiment of the invention is distinguished by the fact that one or more sliding weights are arranged on more than the at least one balance beam. With such a configuration the optimum operating point and the position of the measurement window relative to the operating point can be adjusted even more accurately to the weighing task, because with the different lever ratios, the sliding weights on one balance beam can be used for a coarse adjustment, while the sliding weights on another balance beam can be used for the fine adjustment.

According to a further embodiment, a sliding weight is moved into position by means of a linear drive mechanism or a piezoelectric drive source or by means of a rotary drive mechanism with a spindle, wherein the travel distance of the sliding weight can be controlled by the drive mechanism. Any of these three variants can be employed advantageously, providing very accurate control of the position-setting function.

A preferred embodiment of the invention has an electrical drive mechanism for the positioning of the at least one sliding weight, wherein the drive mechanism itself is part of the sliding weight. The function of positioning the at least one sliding weight can thus be controlled by the processor unit, whereby a higher degree of automation is achieved. Also, the use of space is optimized as the drive mechanism by virtue of its own weight simultaneously serves as a sliding weight.

As a further developed feature of the invention, the at least one sliding weight is attached to the second lever arm by way of a coupler means whereby the weight contributed by the sliding weight can be operatively coupled and uncoupled. This has the advantage of allowing a fast and precise switch between two measurement windows without moving the sliding weight, whereby the reproducibility is again increased.

In a further advantageous development of the invention, the at least one sliding weight can be moved into positions where the weight of the sliding weight acts in opposition to the compensation force of the measurement transducer. This allows the mechanical zero point of a push-pull system to be moved up to and beyond the zero-load condition. The term zero load refers to the state of a force-measuring device where no load is present on the load-receiving part. With a sliding range beyond the zero-load position, the sliding weight can also be used advantageously for the calibration of the force-measuring device, making it unnecessary to install a complete calibration unit in a force-measuring device.

In a method for setting the position of at least one sliding weight of a force-measuring device for a gravimetric measuring instrument, a step of the method entails that a tare load, for example a calibration weight, is placed on the instrument, or that a weight value is entered by the user, or that the tare load is identified from a bar code or an RFID chip by means of a reader device that is arranged on the load-receiving part or connected to the gravimetric measuring instrument. In another step, a setpoint value concerning the measurement window is entered by the user (or, in other words, the contribution of the measurement transducer to the total compensation force is set), or a setpoint value is retrieved from a memory of the processor unit in response to the selection of a weighing task by the user. In a next step, the at least one sliding weight is moved by means of a drive mechanism and positioned so that the measurement transducer generates the set amount, i.e. the required contribution to the compensation force.

This method makes it possible to perform two measurements that are connected to each other as for example in the weighing of filters, or to make individual measurements that belong to a series in which the measurements are separated by long time intervals, so that the balance can be used for other purposes during the intervals. In this mode of operation it is important to ensure that the gravimetric measuring instrument is restored to the same configuration, i.e. the same parameter settings, that were used in the measurement that represents the starting reference. As a minimum this includes that the same target value (contribution of transducer to the compensation force) is selected and the same calibration weight is applied. A calibration weight can be a standardized and/or certified weight that is placed from the outside onto the balance pan, or it can be a calibration weight of a built-in calibration unit that is inside the force-measuring device and can perform its function by coupling or uncoupling the calibration weight.

In a further method, a density value of the weighing object is entered by the user as an additional input or registered from a bar code or an RFID chip by means of a reader device that is arranged on the load-receiving part or connected to the gravimetric measuring instrument, and subsequent to the step of moving the at least two sliding weights to the position in accordance with the setpoint value, their respective positions are adapted independently of each other to the density of the weighing object.

BRIEF DESCRIPTION OF THE DRAWINGS

The subject of the invention will now be explained by way of examples of preferred embodiments which are illustrated in the attached drawings, wherein.

DETAILED DESCRIPTION

Features with the same function and similar configuration are hereinafter identified by the same reference symbols. The following description covers both measurement principles, i.e. the principle of the push system and the principle of the push-pull system.

Figure 1:
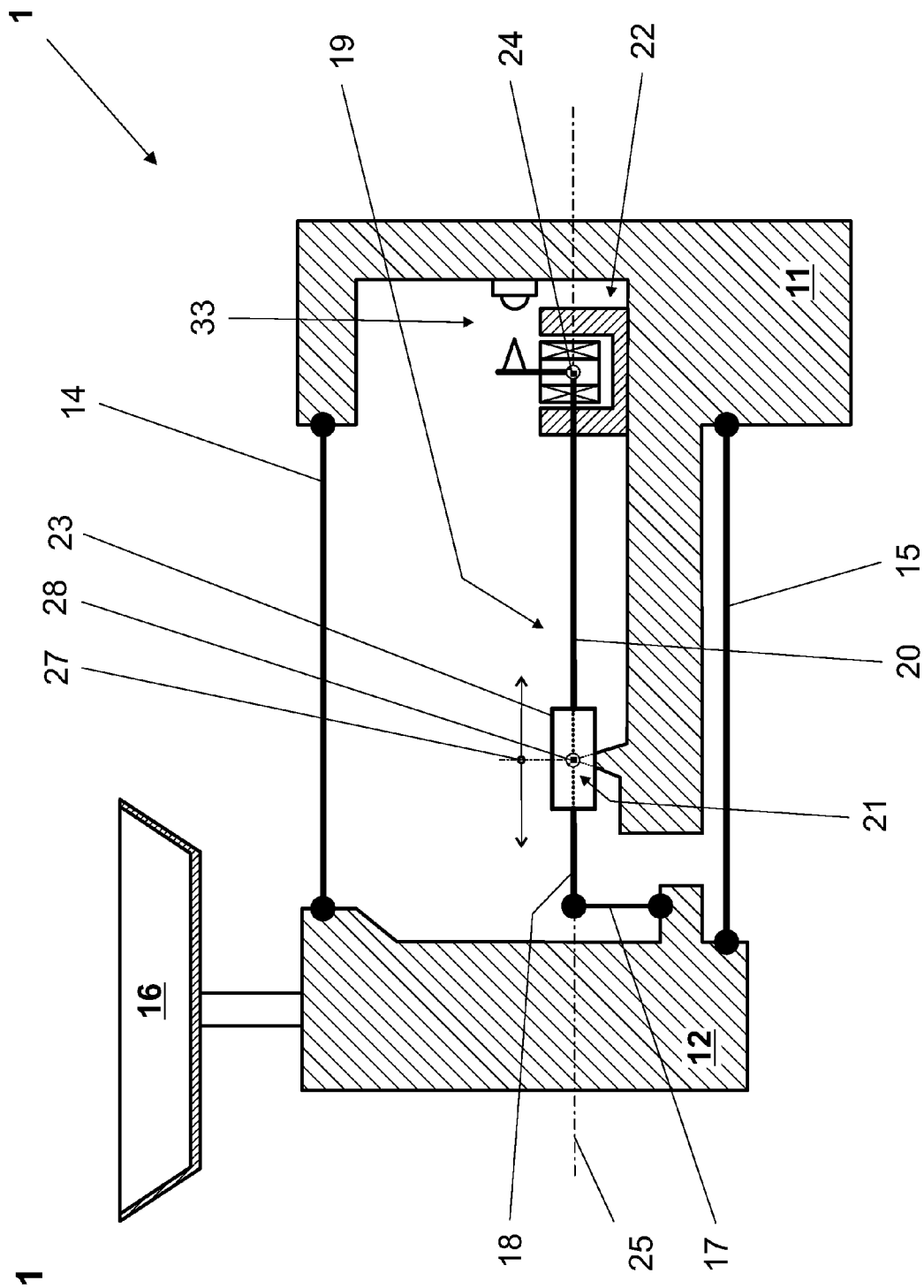
FIG. 1 is a schematic sectional representation of a top-loading force-measuring device with a sliding weight.

FIG. 1 schematically illustrates a force-measuring device 1 according to the invention in a sectional view directed from the side. With its stationary part 11, the force-measuring device 1 stands on a supporting structure. The load-receiving part 12, which is connected to the stationary part 11 by two parallel-guiding members 14 and 15 carries a weighing pan 16 on which the weighing load is placed. The invention is not limited to the illustrated design arrangement with the pan on top. The force-measuring device could also be configured with a suspended pan. The coupling element 17 transmits the weight force to the first lever arm 18 of the balance beam 19 which is pivotally supported at the fulcrum 21 (hidden in FIG. 1 behind the sliding weight 23), wherein the fulcrum 21 is kinematically defined as a pair of support points 21a and 21b(see FIG. 3). The second lever arm 20 carries at its outer end the measurement transducer 22 which counteracts the lever-reduced weight force with a compensation force. The quantity measured by the transducer 22 can be used to set the position of the sliding weight along the balance beam 19. However, the position of the sliding weight 23 can also be set directly based on the measurement signal of the position sensor device 33. The position of the sliding weight 23 is measured and monitored by a travel-measuring device. Based on input from the user or from a reader device connected to the gravimetric measuring instrument, the travel-measuring device can also serve to control the movement of the sliding weight 23 to the position required to generate the appropriate compensation force.

The range of movement of the sliding weight 23 in a push-pull system has a starting position where the maximum compensation force of the sliding weight 23 acts in the same direction as the compensation force of the measurement transducer 22, a neutral position 27 where the sliding weight has no influence on the behavior of the balance beam 19 under equilibrium conditions, and an ending position where the maximum compensation force of the sliding weight 23 acts in opposition to the measurement transducer 22. In a push system, the neutral position 27 is at the fulcrum 21 and represents at the same time the starting position of the sliding range. In a push-pull system, the neutral position 27 lies at some intermediate point between the starting position and the ending position of the sliding range, depending on the design of the mechanism and the measurement transducer 22 of the force-measuring device 1. In a symmetrical push-pull system, the neutral position 27 lies at the midpoint of the measurement window, i.e. the measurement window is divided into a push domain and a pull domain of equal size.

As the measurement transducer 22 in a push system can only generate a unidirectional compensation force, the range of movement of the sliding weight 23 of a force-measuring device with a push system begins at the neutral position 27 where the sliding weight has no influence on the behavior of the balance beam under equilibrium conditions. At the opposite end of the moving range, the maximum compensation force of the sliding weight 23 is acting in the same direction as the compensation force of the measurement transducer 22. If the force-measuring device shown in FIG. 1 is looked at as a push system, the neutral position 27 of the sliding weight 23 is at the fulcrum 21, and the sliding weight can be moved in the direction towards the measurement transducer 22.

The determining factor in the positioning of the sliding weight 23 is the center of mass 28 of the latter. The center of mass 28 is the combined center of gravity of all movable and/or slidable parts belonging to a given sliding weight 23.

When the sliding weight 23 is moved relative to the measurement transducer 22, the latter is given a correspondingly larger or smaller share in generating the compensation force, i.e. the measurement window is shifted towards heavier or lighter loads, or in other words, the operating point of the force-measuring device 1 is thereby matched to the mechanical zero point. This concept is used in practice for the weighing of a dead load, for example a container that is to receive the weighing sample. The measurement window can thus be ideally adapted to the weighing task. This applies to the push system as well as to the push-pull system.

Figure 2:
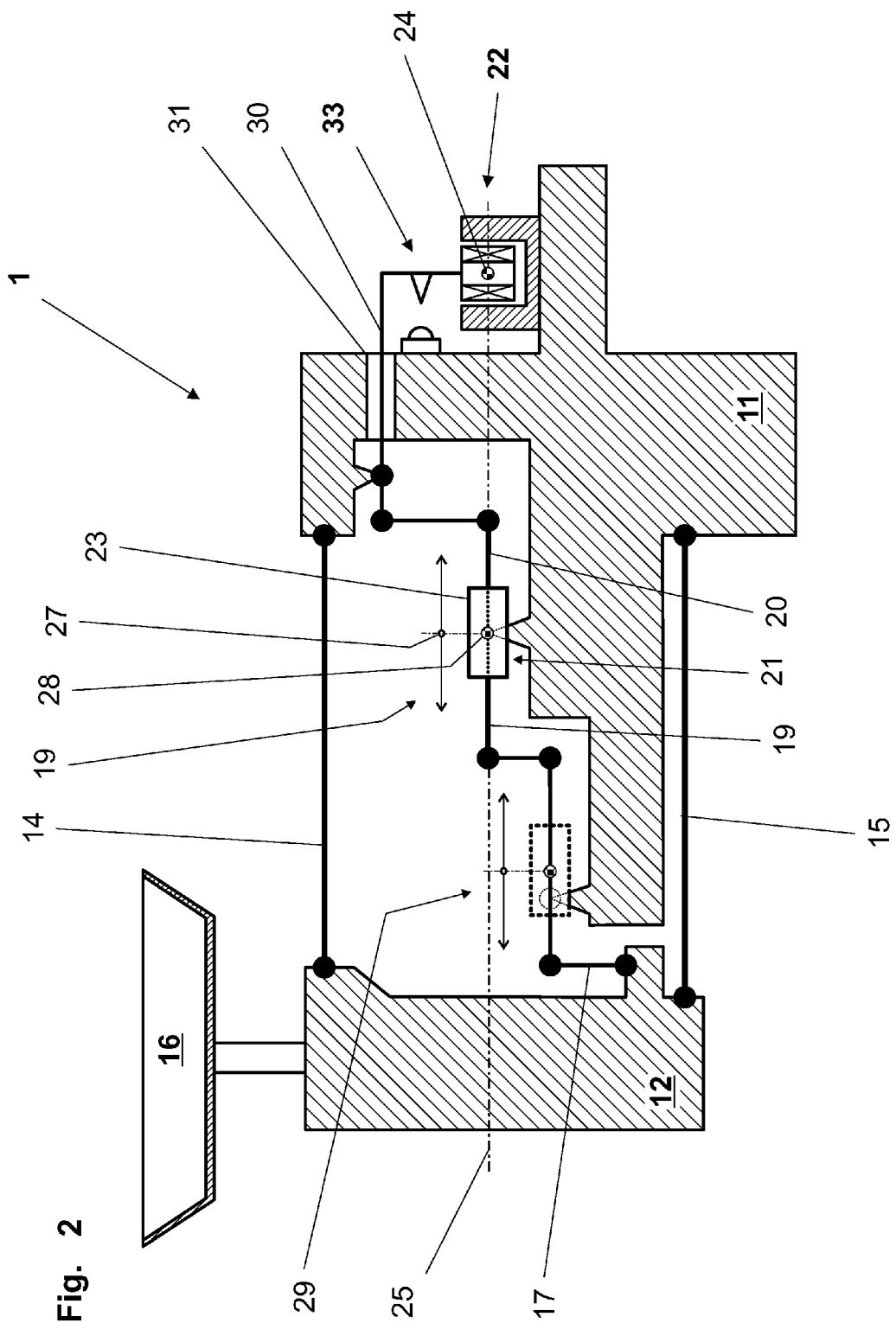
FIG. 2 is a schematic sectional representation of a top-loading force-measuring device with a sliding weight and with additional levers.

The embodiment which is illustrated in FIG. 2, again in a simplified, schematic form, is analogous to FIG. 1 but has additional levers. The load placed on the load-receiving part 12 is transmitted to the first lever arm 18 of the balance beam 19 by way of the coupling element 17 and a lever stage 29 that precedes the balance beam 19. Following the second lever arm 20, a lever 30 transmits the load to the measurement transducer 22. Due to the passage opening 31, the measurement transducer 22 can be arranged at a location that is easily accessible for maintenance and/or repair work. In contrast to FIG. 1, the sliding weight 23 in the arrangement of FIG. 2 is moved away from the measurement transducer 22 in order to counteract a load placed on the load-receiving part 12. However, there is no change in the effect that the measurement transducer 22 is assisted by the sliding weight in generating the compensation force. With the use of further levers 29 and 30, it should therefore be noted that the sliding direction for the weight for heavier or lighter loads alternates in accordance with the number of lever stages. Preferred is an arrangement of the lever stages where the weight of the measurement transducer 22 itself acts in opposition to a load placed on the load-receiving part 12. As mentioned previously, it does not matter whether the at least one sliding weight 23 is arranged on the lever 29 or 30 or on the balance beam 19, except that a larger lever ratio produces a larger compensation force. It is also possible to use a plurality of sliding weights 23 arranged on more than one lever. Depending on the lever ratios, such an arrangement can be used for a coarse and/or fine adjustment of the compensation force.

Figure 3:
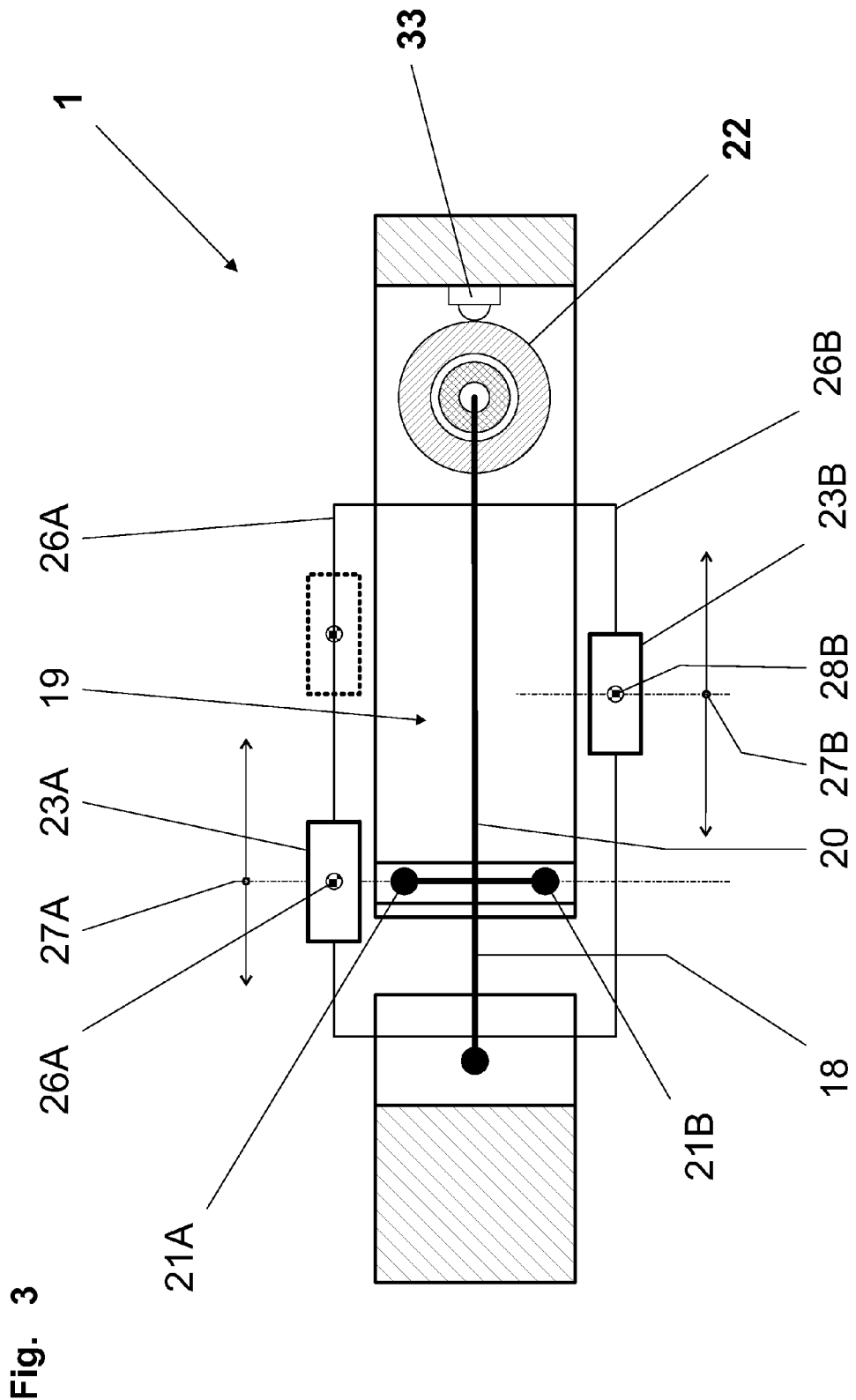
FIG. 3 represents a section of the FIG. 1 force-measuring device in the plane of neutral equilibrium in an embodiment with two sliding weights.

In a schematic sectional view, FIG. 3 shows an embodiment where the balance beam 19 carries two sliding weights 23A and 23B which can be moved independently of each other along the movement axes 26A and 26B, for example in order to allow a compensation of a buoyancy effect. A buoyancy compensation follows the same sequence of operations as the procedure for setting a target value that has been described previously herein. After the sliding weights 23A and 23B have been put in place and after the density of the weighing object has been transmitted to the processor unit 35 (not shown in FIG. 3) either by the user or by means of a reader device that is connected to the gravimetric measuring instrument, the adaptation is performed. This is accomplished by moving the sliding weights 23A and 23B individually from their previous positions in the direction towards the measurement transducer 22 or towards the load-receiving part 12, depending on the density value, as will now be explained by way of an example.

In this example it is assumed that two sliding weights 23A and 23B with respective densities of 7 $kg/dm^3$ and 9 $kg/dm^3$ are installed in anticipation of the task of weighing a reference mass made of steel with a density of 7.8 $kg/dm^3$. After the target value has been set in accordance with the method described previously, the sliding weights 23A and 23B are abreast with each other and are compensating the weight force according to the predefined specifications, for example for a metrological measurement, with the sliding weights 23A, 23B together and the measurement transducer contributing one-half each. The balance beam is in equilibrium at this point. Now, if the air density were to change in this measurement over a longer duration, the two sides of the balance beam would not be subjected to the same change in buoyancy. Because the two sliding weights 23A, 23B, seen as a unit, would have a density of 8.0 kg/dm$^3$, they would deviate from the reference mass by 0.2 kg/dm$^3$. As a consequence, the measuring result of the force-measuring device 1 would deviate from the actual value, which would render the measurement useless.

In order to compensate for the influence of air buoyancy, the processor unit 35, after the setting of the target value has been completed, will control the sliding weights 23A, 23B individually based on a formula that is stored in the memory of the processor unit 35. The sliding weight with the lower density is moved in the direction of the measurement transducer 22 and the sliding weight with the higher density is moved in the direction of the support points 21A and 21B in such a way that the combined center of mass of the sliding weights 23A and 23B is not changed. Due to the different fulcrum distances of the sliding weights 23A and 23B, their combined effect is equivalent to a density of 7.8 kg/dm$^3$, which equals the density of the reference mass, so that the respective air buoyancies of the sliding weights and the reference mass are in equilibrium with each other.

If the force-measuring device 1 of FIG. 3 is looked at as a push system, the first sliding weight 23A is located at the neutral position 27A, while the second sliding weight 23B is counteracting a load that is applied to the road-receiving part 12.

If the force-measuring device 1 of FIG. 3 were looked at as a symmetrical push-pull system, the sliding weight 23B would be located at the position where its compensation force counteracts a load applied to the load-receiving part 12, while the other sliding weight 23A would be located at the neutral position 27A where its compensation force has no influence on the behavior of the balance beam 19 under equilibrium conditions. Accordingly, the sliding weight drawn in a broken outline would be in a position where its compensation force likewise counteracts a force applied to the load-receiving part 12.

In a force-measuring device 1 operating according to the push-pull principle, the supplementary weight that needs to be added to the second lever arm can be incorporated in the sliding weight, so that the neutral position 27 of the sliding weight 23, 23A, 23B is shifted in the direction of the measurement transducer.

Figure 4:
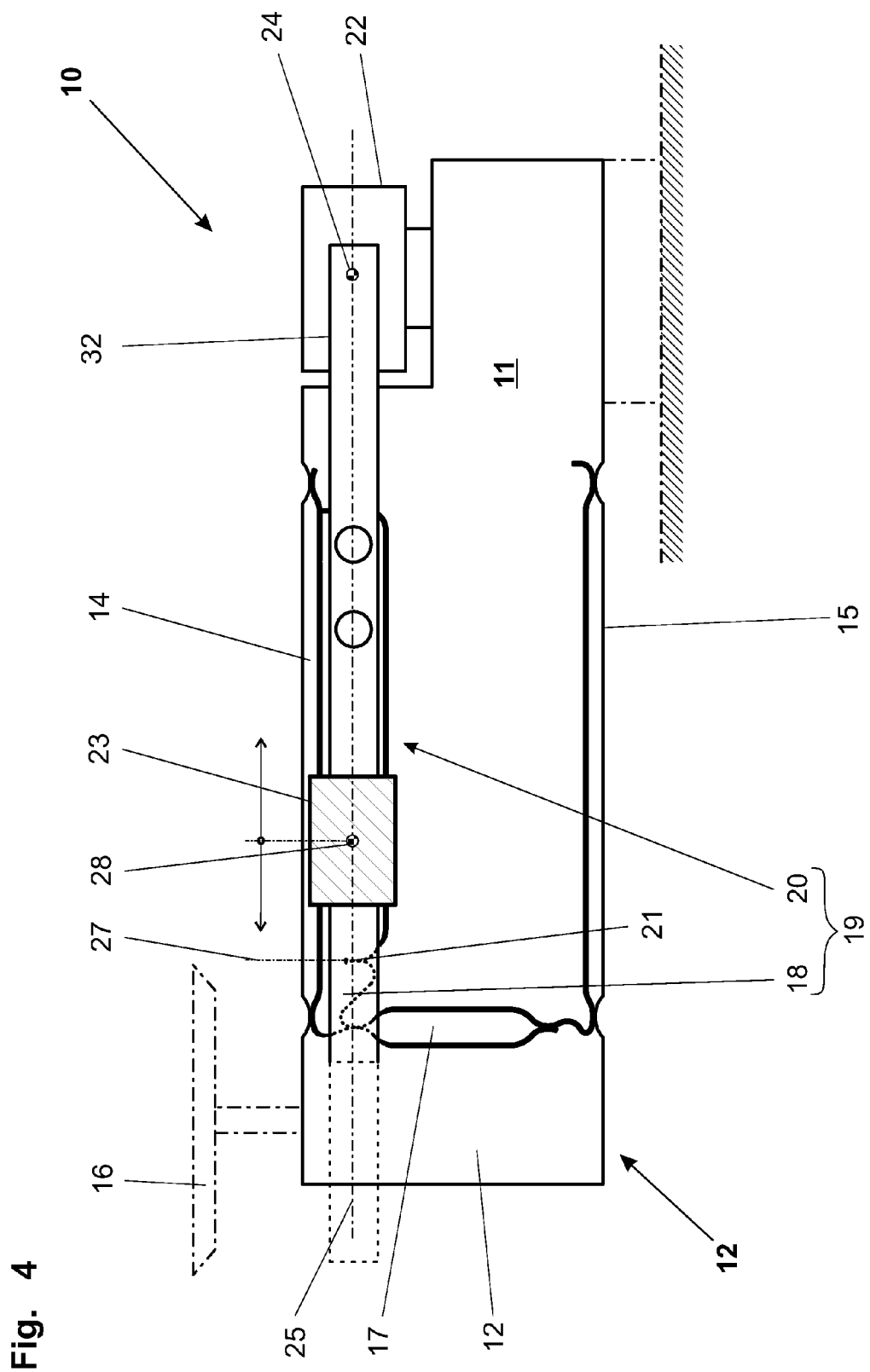
FIG. 4 depicts a force-measuring cell of a force-measuring device with a sliding weight.

FIG. 4 shows a possible embodiment of a force-measuring cell 10 of a force-measuring device configured as a monolithic measuring cell. The second lever arm 20 (mostly hidden by the guide rail 32) of the balance beams 19 carries a laterally attached guide rail 32 which extends the second lever arm 20 towards the measurement transducer 22 and simultaneously serves as the axis 26 for the guided movement of the sliding weight 23. The same arrangement can also be attached to the opposite side or to both sides simultaneously. If the fulcrum axis and the center of mass of the balance beam 19 (inclusive of the coil, but without sliding weights), the connection of the first lever arm 18 to the coupling element 17 and the center of force generation 24 of the measurement transducer 22 are all lying in a common plane and as long as no load is placed on the weighing pan, the balance beam 19 is not subjected to any moments and always in equilibrium, independent of an out-of-level condition of the balance. The common plane is referred to as the plane of neutral equilibrium 25.

In a force-measuring cell 10 with a measurement transducer 22 that functions according to the push-pull principle, the guide track 32 should also be extended in the direction towards the load-receiving part 12 (extension drawn in broken lines) in order to allow the sliding weight 23 to be moved beyond the fulcrum 21 to a farther removed starting position. In particular in a force-measuring device 1 operating according to the push-pull principle, the extended guide track allows the mechanical zero point to be moved to a zero-load position. If the at least one sliding weight 23, 23A, 23B is moved beyond the position corresponding to zero load, its weight force will act in opposition of the measurement transducer 22 and can thus be used as a calibration weight.

Figure 5A:
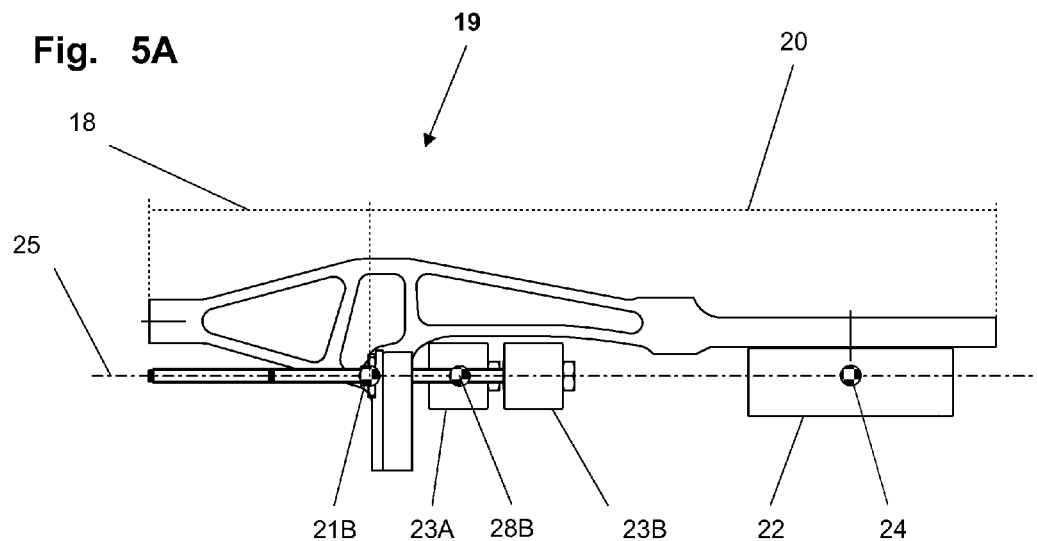
FIGS. 5A and 5B represent, respectively, a side view and a top view of a balance beam of a force-measuring device with sliding weights.
Figure 5B:
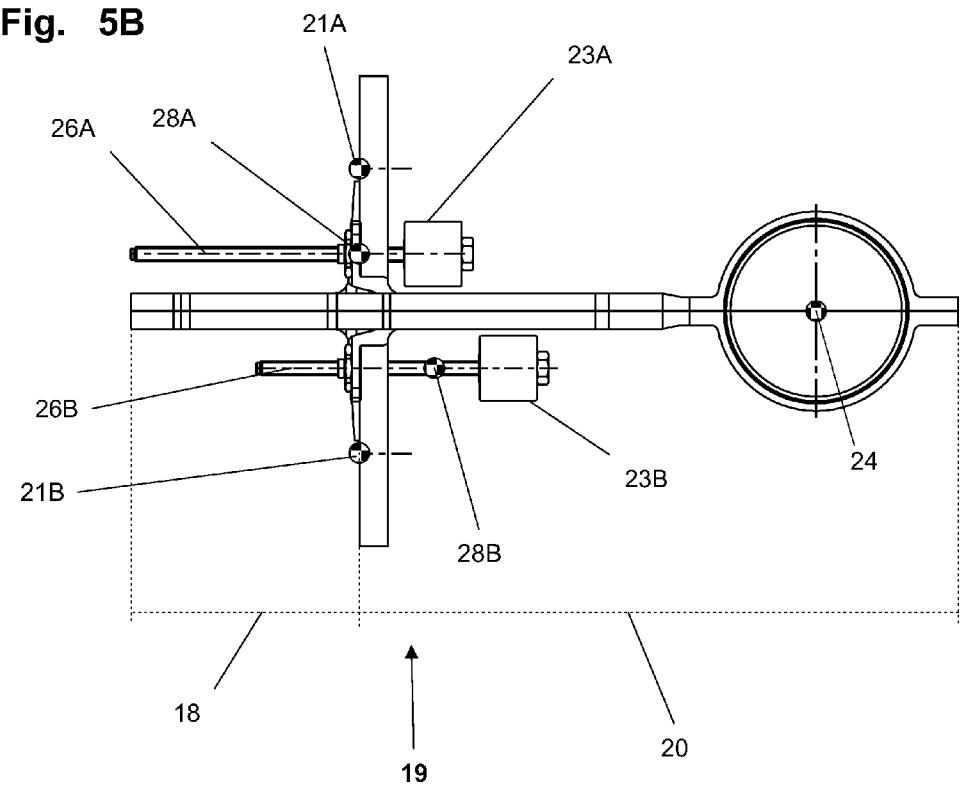

A possible design of a balance beam 19 is illustrated in FIGS. 5A and 5B. Arranged on one end is the measurement transducer 22 which generates the compensation force. The center of force generation 24 lies in the plane of neutral equilibrium 25. Also situated in the plane of neutral equilibrium 25 are the respective centers of mass 28A and 28B of the two sliding weights 23A and 23B, as well as the support points 21A and 21B (hidden in FIG. 5A). Both FIGS. 5A and 5B show the center of mass 28A of the sliding weight 23A in line with the support points 21A and 21B. Thus, the sliding weight 23A does not exert a moment on the balance beam 19, in contrast to the sliding weight 23B which is offset in the direction towards the measurement transducer 22. The dotted demarcation lines indicate which parts of the balance beam 19 belong to the first lever arm 18 and which belong to the second lever arm 20. As can be seen in FIG. 5B, the sliding weight 23A could still be moved farther away from the measurement transducer 22.

Figure 6:
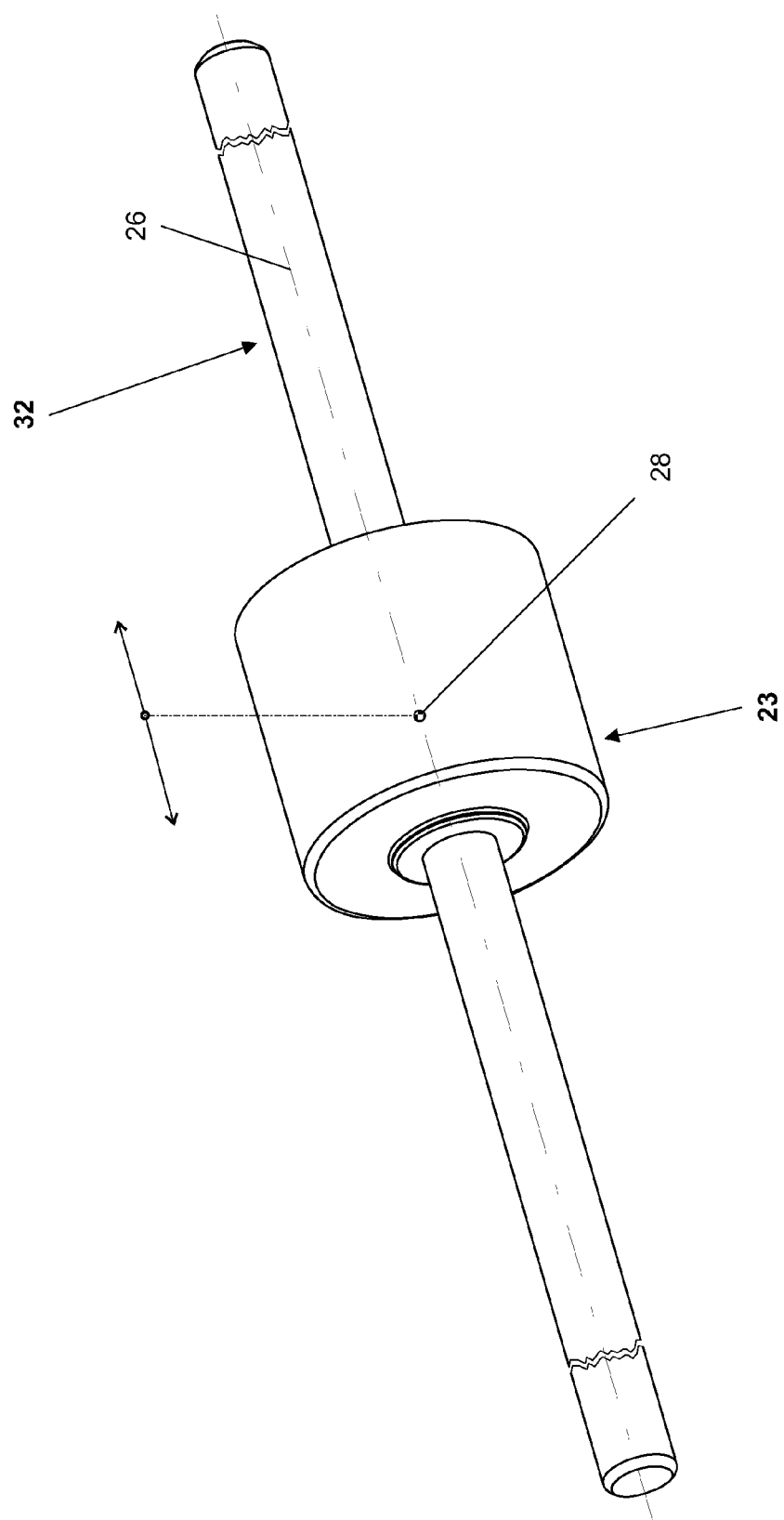
FIG. 6 represents a three-dimensional view of an embodiment of a sliding weight.

FIG. 6 shows an example for the kind of sliding weight 23 that is illustrated in FIGS. 1 to 5 as well as 7 and 8 as sliding weight 23, 23A, 23B, 823, slidable along an axis 26 that is shown here as a round guide rod 32. There are other configurations that are suitable for guiding the sliding weight 23 along an axis of linear movement 26, for example a threaded spindle, a tooth rack, a grooved track, and other guide elements which have in particular a profile that prevents rotation. The drive mechanism for moving a sliding weight 23 can be configured as a rotary motor with a threaded spindle or as a linear drive mechanism or as a piezoelectric motor. The motor can also be part of the sliding weight 23, 23A, 23B itself.

Figure 7:
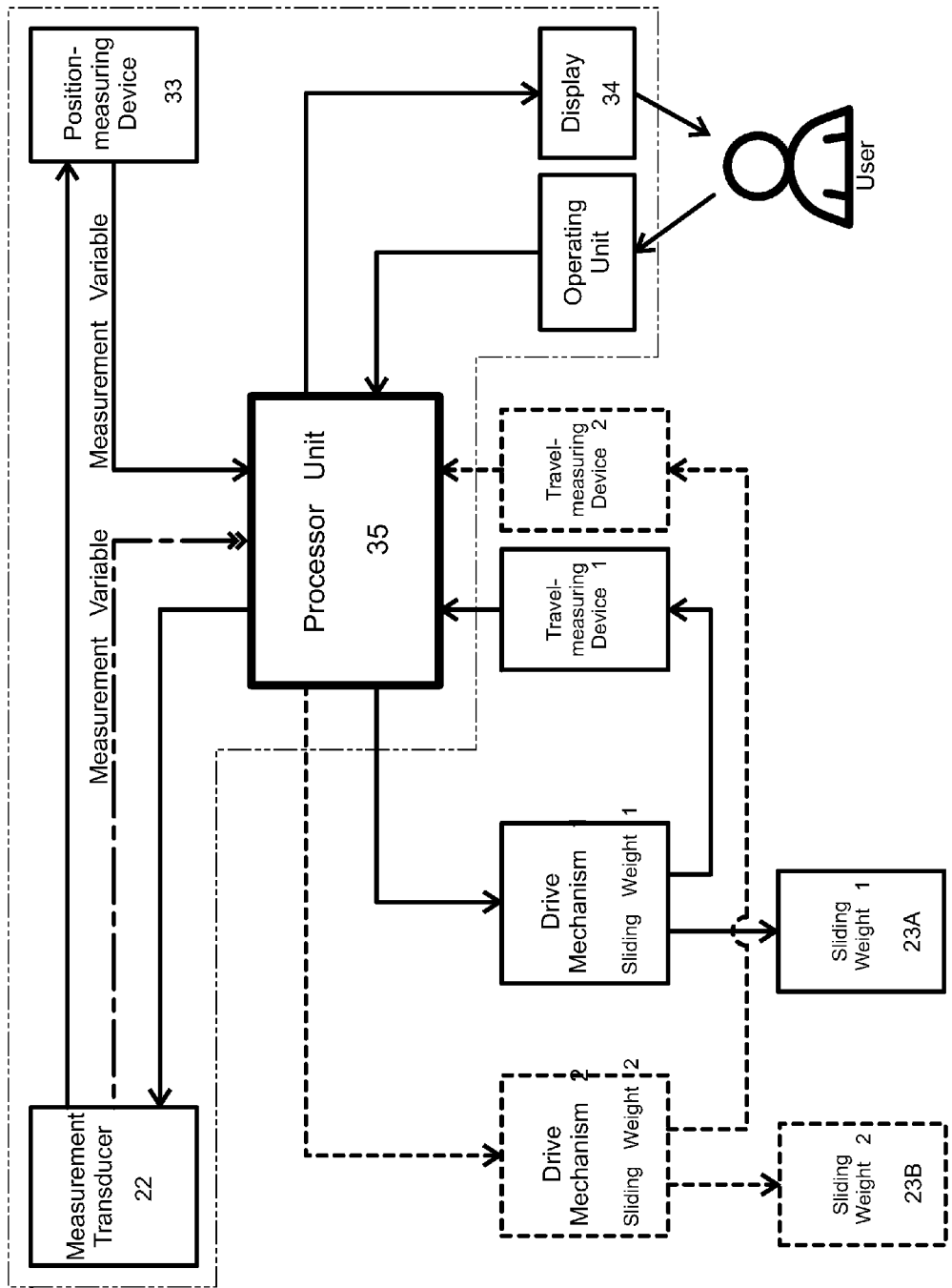
FIG. 7 represents a block diagram through which the flow of functions in a force-measuring device of the invention is described.

The block diagram of FIG. 7 illustrates the operational sequences taking place in the force-measuring device 1 according to the invention. Contemporary force-measuring devices based on the MFR principle include at least those elements that are drawn inside the dash-dotted borderline. In normal operation, i.e. in accordance with a common type of MFR force-measuring device, the processor unit 35 receives from the position-measuring device 33, in most cases an optoelectronic sensor, the magnitude and direction of the deviation from the state of equilibrium. Based on this information, the processor unit 35 regulates the compensation force by way of the measurement transducer 22. The process repeats itself continuously, while the processor unit 35 calculates the weight of the weighing object based on the measurement signal of the measuring transducer 22, and the weight is communicated to the user through a display 34.

A force-measuring device 1 according to the invention has at least one sliding weight 23 arranged on a balance beam 19, wherein the sliding weight 23 can be moved by a drive mechanism under the control of the processor unit 35 in order to generate a compensation force. The compensation force generated by the sliding weight 23 acts directly on the measurement transducer 22, and the quantity measured by the measurement transducer 22 can be used directly to set the position of the sliding weight 23. Thus there are two possibilities for the processor unit 35 to adapt the compensation force to the object that is to be weighed. The outcomes achieved by these adaptations are that a load acting on the load-receiving part 12 is compensated, or that the air buoyancy acting on the load is compensated, or that the measurement window of the force-measuring device 1 is shifted, or that the sensitivity to rotational oscillations is partially or totally compensated, or that several of these purposes are met at the same time. It is also possible to use the measurement signal of the position-sensor device 33 as the control variable for the position of the sliding weight 23.

A travel-measuring device registers and monitors the position of the sliding weight 23A, 23B along the sliding range. Thus, the current position of the sliding weight 23A, 23B is always known to the processor unit 35, so that the latter can calculate the compensation force of the at least one sliding weight 23, 23A, 23B based on stored data for position settings, preload compensation settings, buoyancy compensation settings and/or rotational compensation settings. Conversely, the processor unit 35 can determine from the stored setting data where the at least one sliding weight 23, 23A, 23B needs to be positioned.

Figure 8A:
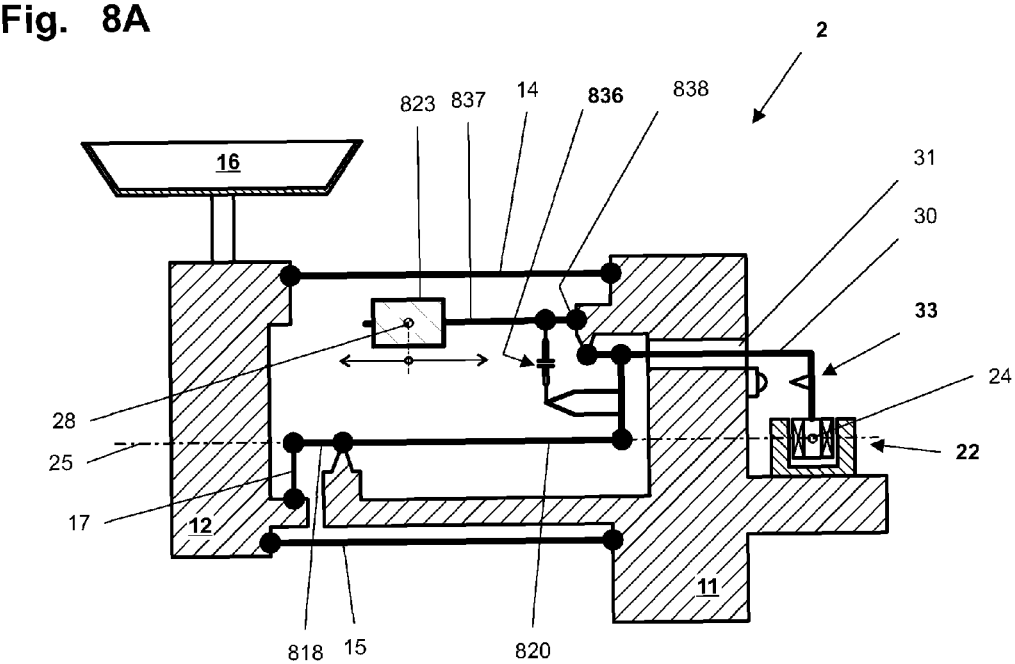
FIGS. 8A and 8B are schematic representations of embodiments of a force-measuring device with a coupler means for the sliding weight.
Figure 8B:
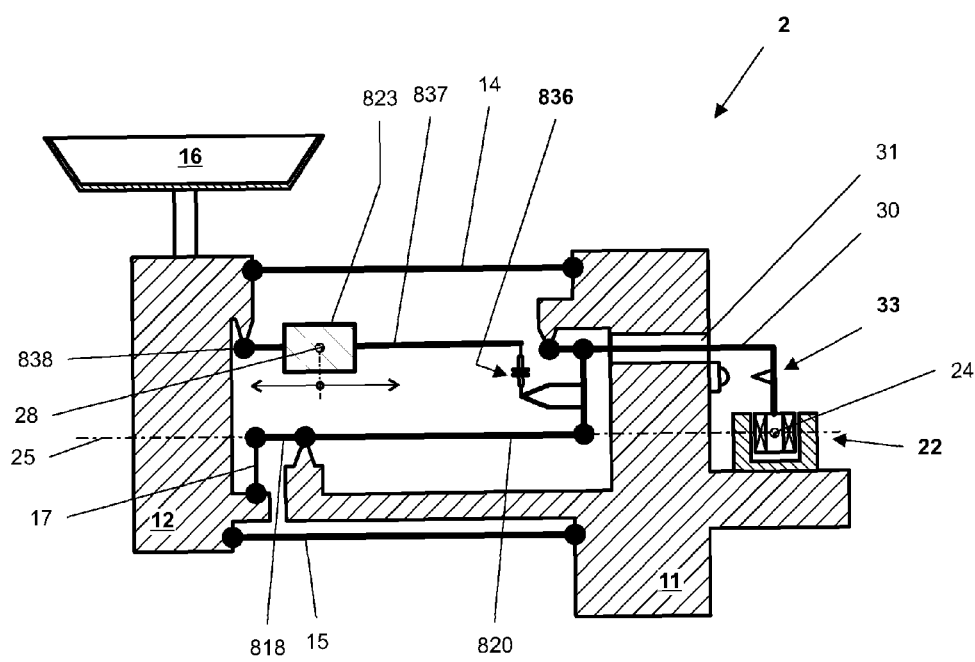

FIGS. 8A and 8B show two further embodiments of the force-measuring device of FIG. 1. Components that are analogous to those in FIG. 1 and FIG. 2 carry the same reference symbols and for their explanation the reader is therefore referred to the description of FIGS. 1 and 2.

In contrast to the embodiment of FIG. 1, the force-measuring devices 2 of FIGS. 8A and 8B have a sliding weight 823 that is arranged on a separate sliding weight lever 837 between the fulcrum 838 and a further coupler element 836. The further coupler element 836 is in this case configured as a unidirectional coupler element which transmits a compressive force. Preferably, the position of the sliding weight 823 is variable, i.e. the latter can be moved on the sliding weight lever 837 and locked in a new position. Thus, the sliding weight 823 in this configuration is part of an embodiment wherein the force of the sliding weight 823 which is transmitted by way of the coupler means 836 to the second lever arm 820 acts in opposition to a load placed on the load-receiver part 12. FIGS. 8A and 8B differ from each other only in the arrangement of the fulcrum 838. While the fulcrum in the embodiment of FIG. 8A is located on the stationary part 11, the analogous fulcrum in FIG. 8B is attached to the load-receiving part 12.

Figure 9A:
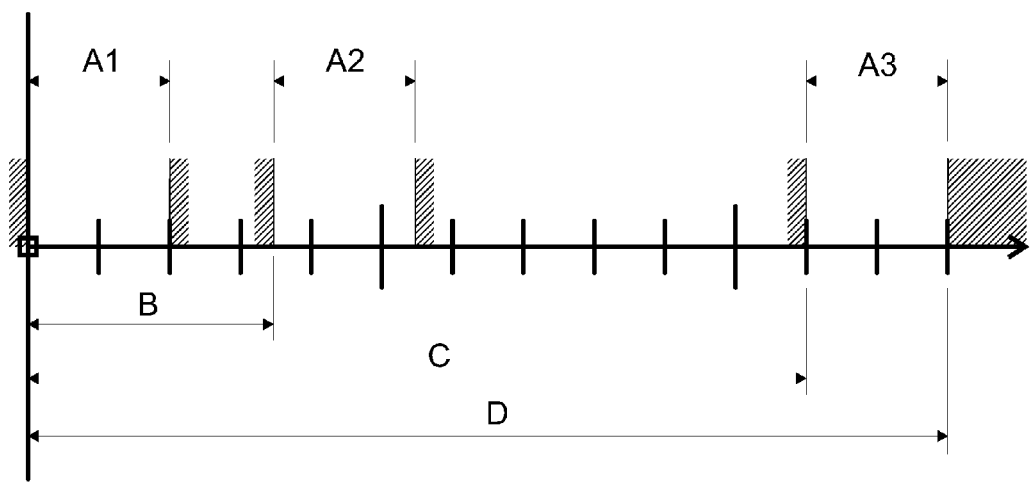
FIGS. 9A and 9B represent one-dimensional diagrams illustrating the shifting of the measurement window in a push system (9A) and in a push-pull system (9B)
Figure 9B:
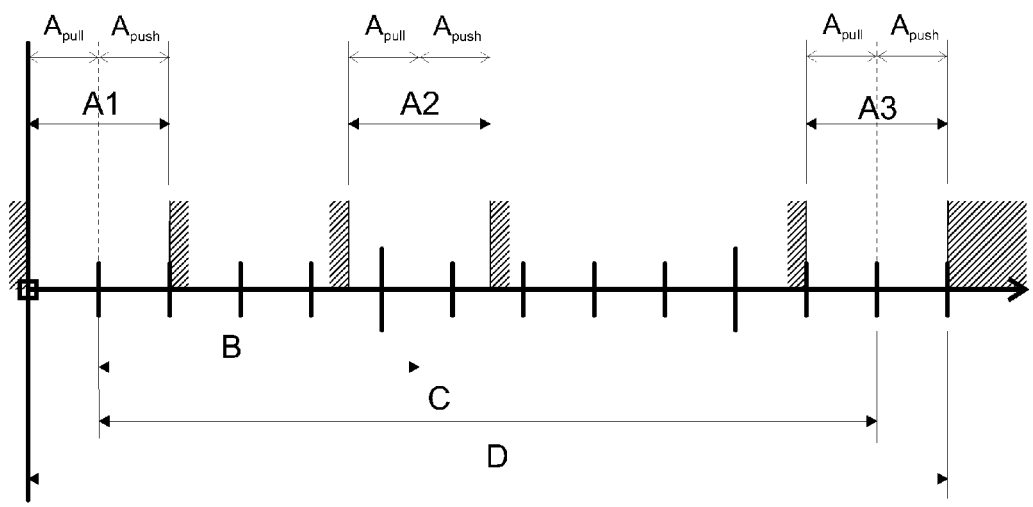

The graphs of FIGS. 9A and 9B, wherein the horizontal axis represents the weight force of an applied load or the total compensation force of a force-measuring device, illustrate how the measurement window A can be shifted within the weighing range D of a force-measuring device 1 according to the invention. The weighing range of a force-measuring device 1 is the weight range within which the mass of the weighing object can be determined. The subsections A1, A2, A3 represent measurement windows of the force-measuring device 1 in different positions. The width of these subsections remains constant and is defined by the maximum compensation force of the measurement transducer 22. Generally, the stronger the compensation force of a measurement transducer, the wider the measurement window.

In a push system, the neutral position 27 of the at least one sliding weight 23 corresponds to the measurement window A1 in FIG. 9A. A shift of the measurement window A1 by the amount B leads to the measurement window A2. The compensation force opposing the applied load is now generated in part by the sliding weight and in part by the measurement transducer 22. A position shift B can be set with stepless variation, so that the measurement window A can be shifted in a continuous manner.

Analogous to FIG. 9A, the situation for a push-pull system is illustrated in FIG. 9B. Each of the measurement windows A1, A2, A3 has a push- and a pull domain. In the example of FIG. 9A, these domains are symmetrical, but depending on the design of the measurement transducer 22, the domains could also be asymmetrical, i.e. of different width. The point of transition from the push- to the pull domain represents the mechanical zero point of a force-measuring device 1 of this kind. The measurement window A2 is shifted by the amount B and positioned advantageously in such a way that the compensation force of the sliding weight 23 is matched to the applied load, or that the force-measuring device 1 is operating at the mechanical zero point. The shifting of the measurement window A is also used to compensate for the preload of a weighing receptacle.

The maximally possible shift C has been reached when the sliding weight 23 is fully deployed. By adding the measurement window A to the shift C, the weighing range D of the force-measuring device is defined. While the commonly used MFR force-measuring devices of the current state of the art have a weighing range equal to the measurement window, the weighing range of a force-measuring device 1 of the present invention can be expanded by a multiple of the measurement window. The higher the precision with which the shift movements of the sliding weights 23, 23A, 23B can be controlled, the heavier will be the masses that can be used for the sliding weights and the larger the weighing range.

Figure 10A:
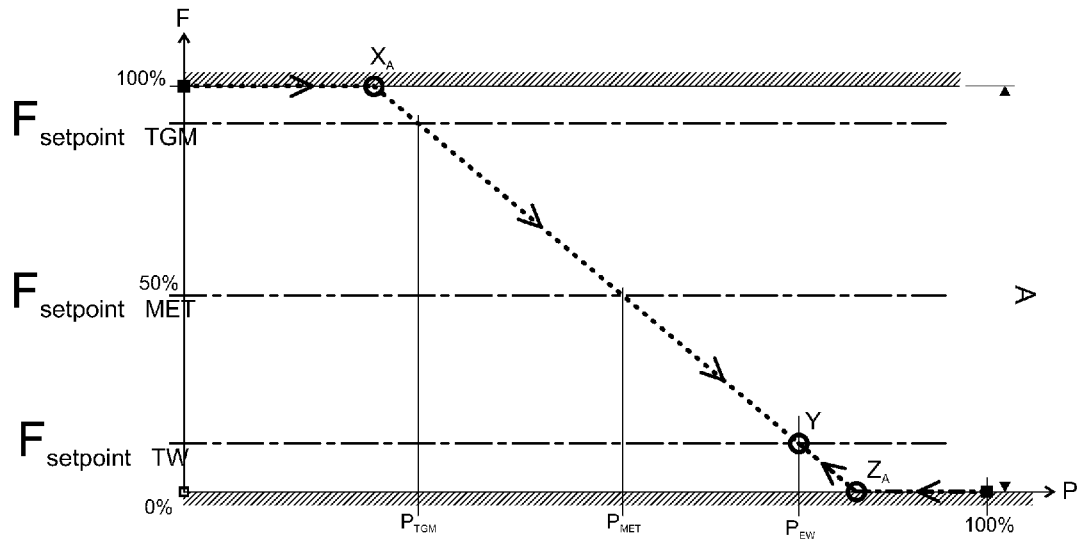
FIGS. 10A and 10B represent two-dimensional diagrams illustrating the setting of the target load within a measurement window for a push system (10A) and for a push-pull system (10B).

FIG. 10A will serve as an example to explain the setting of a reference value in a push system for the target-weighing into a given measuring receptacle (dotted line). The diagram shows the compensation force of the measurement transducer 22 (F-axis) as a function of the position of the at least one sliding weight 23 (P-axis). In the initial state, a measuring receptacle is placed on the weighing pan 16. The receptacle, being too heavy and therefore outside of the measurement window, cannot be weighed by the force-measuring device 1. As the weighing process is started, the processor unit 35 registers by way of the measurement transducer 22 that the measurement window A is off to the low side of the applied load (based on the fact that the measurement transducer 22 is at 100% of its full compensation force). As a result, the processor initiates a shift movement of the sliding weight 23 so that the contribution of the sliding weight 23 to the compensation force is increased. At point X, the measurement returns back into the measurement window A, albeit at its upper end where the compensation force of the measurement transducer 22 is still at its maximum. However, in a push system the at least one sliding weight 23 continues to be moved further in the same direction until the part of the compensation force that is contributed by the measurement transducer 22 has decreased to about 2% to 8% of the total compensation force (this value is set by an entry of the user or by the function "target-weighing" in the processor unit 35). At this point, the force-measuring device 1 is ready to weigh the weighing object which would be put with the measuring receptacle onto the weighing pan 16. The net weight of a load can now be weighed with the rest of the remaining range of the measurement window (92% to 98%).

Figure 10B:
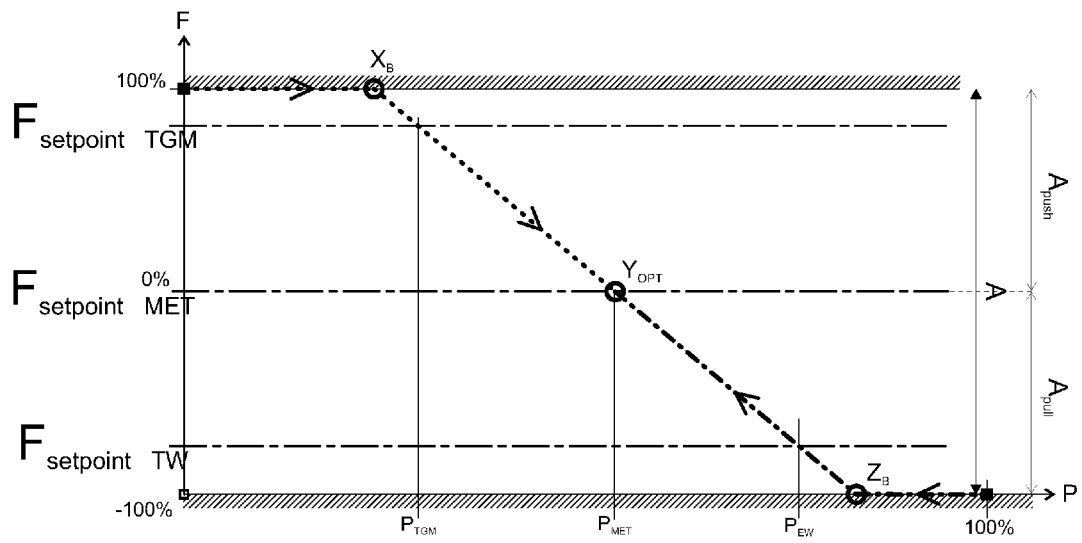

The example of FIG. 10B illustrates the situation in a push-pull system. After the position X has been reached, the shift movement of the sliding weight 23 is continued to the point Y where the part of the compensation force that is contributed by the measurement transducer 22 is about to vanish, i.e. the transition between push- and pull mode. In this condition, the force-measuring device 1 is at its mechanical zero point, and the activity of the measurement transducer 22 is reduced to regulating only minor deviations as caused for example by temperature effects and air drafts. This point Y represents the optimal operating point which allows a good regulation of the measurement variable of the measurement transducer 22 and a precise determination of the measurement value. In the example of FIG. 10B, push- and pull mode are distributed 50%/50% in the measurement window, i.e. point Y is set symmetrically at the center. However, this is not an actual requirement and depends on the configuration of the force-measuring device 1 and the measurement transducer 22.

The shift movement of a sliding weight 23, 23A, 23B and the resultant positioning can occur in a variety of ways, on the one hand by means of the measurement variable registered by the measurement transducer 22 and/or the position-measuring device 33 (as described above), and on the other hand by means of the travel-measurement device and a suitable control of the drive mechanism of the sliding weights 23, 23A, 23B.

As a given input quantity, the user enters into the operating unit the known mass of the measurement receptacle or of the standardized and/or certified calibration weight. After the measurement receptacle or the standardized and/or certified calibration weight has been placed on the weighing pan 16, the processor unit 35 determines which way the sliding weight 23, 23A, 23B needs to be shifted, based on the output signal of the position-measuring device 33. The control of the drive mechanism by the processor unit 35 can occur stepwise in time intervals or in rotary or linear increments, wherein a time interval or an increment corresponds to a defined position change of the sliding weight 23, 23A, 23B. At point X or point Z, respectively, the upper or lower end of the measurement window has been reached. Starting from here, the processor unit 35 calculates the number of time intervals or rotary or linear increments to apply for the control of the drive mechanism of the sliding weight 23, 23A, 23B in order to arrive at the position defined by the target value. The correlation between position shift and time interval or rotary/linear increment is therefore stored in the memory of the processor unit 35. It is also possible that the sliding weight 23, 23A, 23B is shifted directly to the position that corresponds to the data entered by the user. The processor unit 35 relies in this case on the available setting parameters such as for example a position setting, a preload-compensation setting, a buoyancy-compensation setting and/or as a rotational compensation setting.

In a push system, the optimal operating point and the position of the measurement window relative to the optimal operating point depend on the weighing task intended by the user. While the already mentioned process of target-weighing requires a measurement window that is open to the side of higher loads, a thermogravimetric measurement calls for a measurement window extending in the direction of smaller loads. For metrological measurements it suggests itself to position the measurement window symmetrically relative to the reference load value. The aforementioned method for the setting of a reference value could also be used in a metrological or thermogravimetric measurement, except that the contribution of the measurement transducer 22 to the total compensation force would have to be different. In a thermogravimetric measurement, this part of the compensation force would be around 92% to 98%, as the mass of the weighing sample decreases over the course of the measurement and the measurement window A should therefore be biased towards lighter load values. In a metrological measurement, the reference value should be at about 47% to 53%. This centered position of the measurement window A is appropriate for weighing tasks where the measurement value can end up within a range extending equally above and below the reference value.

For a push-pull system, the optimal operating point is at the transition from push- to pull mode, i.e. at the mechanical zero point. The setting of the position of the measurement window relative to the operating point therefore depends on the relative proportions of the push- and pull domains in the measurement window A. These domains can be of different width and are determined by the design of the measurement transducer 22. Accordingly, a symmetrical push/pull system has a measurement window A divided equally between a push- and a pull domain.

Under a situation that can also occur, the at least one sliding weight 23 is at the maximum of its travel range, i.e. the sliding-weight range is used to 100%. Thus, the weighing receptacle is too light for a weight measurement, i.e. off to the low side of the measurement window A. In this case (shown in FIG. 10A with dash-dotted line) the processor unit 35 causes the at least one sliding weight 23 to be moved in the direction towards the neutral position 27 until the compensation force of the sliding weight 23 is in equilibrium with the applied load (point Z). The measurement signal is now at the lower end of the measurement window A, i.e. the compensation force of the measurement transducer 22 of a push-system is equal to zero. As the sliding weight 23 is moved further in the direction towards the neutral position 27, the part of the compensation force that is contributed by the measurement transducer 22 decreases until the desired setpoint value or the desired operating point has been reached.

A different situation exists in a push-pull system (see FIG. 10B): at point Z the compensation force of the measurement transducer 22 is at its maximum in the pull domain and decreases with the continued movement of the sliding weight towards the neutral position 27. The preferred, i.e. optimal operating point $Y_{OPT}$ has been reached when the measurement transducer 22 no longer needs to generate a compensation force, i.e. when the force-measuring device 1 is at its mechanical zero point. However, it is also possible in a push-pull system for the user to enter a setpoint value for the proportion of the compensation force or to select the function "target-weighing" in the processor unit 35.

The line connecting the points X and Z in FIGS. 10A and 10B can also be interpreted as a proportion of the width of the measurement window to the width of the weighing range (ratio<1). If the line is sloped at a shallow angle (ratio close to 1), the weight range in which the mass of the weighing object can be determined is slightly larger than the weight range in which the mass of the weighing object can be measured by way of the compensation force of the measurement transducer 33. A larger ratio has the advantage that a higher degree of precision can be attained in the fine adjustment of the compensation force of the sliding weight 23, 23A, 23B. If the connecting line is steeper, the weighing range of the force-measuring device 1 is commensurately larger in proportion to the measurement window, making the force-measuring device 1 more suitable for a broader range of applications.

In a case where two correlated measurements are performed, as for example in the weighing of filters, or in the case of individual measurements that belong to a series and are separated by long time intervals during which the balance is used for other purposes, it is important to ensure that the gravimetric measuring instrument is restored to the same configuration, i.e. the same parameter settings, that were used in the initial measurement which should serve as reference.

This assurance can be achieved through a standard operating procedure (SOP) which could be defined as follows: Prior to placing the weighing object on the force-measuring device, the proportion of the compensation force that is to be contributed by the measurement transducer 22 needs to be determined (which, in a push-pull system, can be a given amount dictated by the measurement transducer 22). A calibration mass is set on the load receiver, whereupon the force-measuring device 1 sets the at least one sliding weight 23, 23A, 23B at the required position and stores the weight value in memory. These two steps need to be performed before the reference measurement and again before the correlated measurement in order to have a reference for this comparison measurement. The calibration mass can be a standardized and/or certified weight that is placed from the outside onto the load receiver, or it can be a calibration weight that is built into the force-measuring device 1 and can be switched in or out for this purpose.

In long-term measurements such as for example a metrological measurement, a change in the ambient temperature, barometric pressure and/or humidity has an influence on the measurement. These fluctuations manifest themselves through a change of the air density. According to Archimedes' principle, if the weighing object and the sliding weight 23 have different densities, a deviation will occur as a result of the change in air buoyancy as soon as the air density fluctuates. To solve this problem, at least two sliding weights 23A, 23B with different densities are arranged on the balance beam 19. Through different position settings of the sliding weights 23A, 23B, it is possible to match not only the weight force but also the buoyant force acting on the second lever arm 20 to those of the weighing object acting on the first lever arm 18. A compensation for the effects of air density is possible if the density of the weighing object lies between the respective densities of the sliding weights 23A and 23B. At the extremes, i.e. if the density of the weighing object is equal to one or the other of the respective densities of the sliding weights 23A and 23B, only the sliding weight whose density matches the weighing object may be shifted in its position, while the other sliding weight remains in the neutral position. This necessarily reduces the range that can be compensated by the sliding weights of the force-measuring device 1. The sliding weights 23A and 23B therefore need to be adapted in regard to their respective densities to the intended use of the force-measuring device 1. As another possibility, one could use a series of sliding weights (i.e. more than two) of different densities. Those that are not used in a given application would be kept at the neutral position 27 and thus have no influence on the balance beam. Depending on the density of the weighing object, one would select the sliding weights that are appropriate for the application.

In order to broaden the range of application for the force-measuring device 1, the at least one sliding weight 23, 23A, 23B can be exchanged. For example, a heavier sliding weight 23, 23A, 23B results in a larger sliding-weight range C (see FIG. 9). A replacement weight that is lighter than the one that was previously in place will result in a smaller sliding-weight range C, but also in a finer and thus more precise adjustability. The density of the weighing objects can be taken into account by exchanging the sliding weights for new ones of equal weight but different density.

When a plurality of sliding weights 23, 23A, 23B are being used, it becomes necessary to synchronize them. A first possibility is to move the sliding weights 23, 23A, 23B to an end stop and to store an associated adjustment value in the memory of the processor unit. A synchronization at the mechanical zero point is likewise possible. The latter has the advantage that the influence of a moment acting on the force-measuring device 1 from the outside is minimized, i.e. that the highest accuracy is achieved in the adjustment. The latter possibility proves to be particularly well suited for push-pull systems.

Although the invention has been described by presenting an example of a specific embodiment, it is considered evident that numerous further variants could be created based on the teachings of the present invention, for example by combining features of the individual embodiments with each other and/or by interchanging individual functional units between the embodiments.

What is claimed is:

1. A device for measuring a force, operating according to the principle of electromagnetic force compensation, for a gravimetric measuring instrument, the device comprising:
   a stationary part;
   a load-receiving part;
   a pair of parallel guide members which connect the stationary part to the load-receiving part;
   at least one balance beam, having first and second lever arms;
   a measurement transducer, comprising, as elements, an electromagnetic coil and a permanent magnet, such that movement of the electromagnetic coil in an air gap of the permanent magnet generates a current, one of the elements carried by the second lever arm and the other element located on the stationary part;
   a coupling element, acting on the first lever arm to connect the balance beam to the load-receiving part, directly or by way of further lever, and acting on the second lever arm to connect the balance beam to the measurement transducer, directly or by way of further levers;
   and
   at least one sliding weight, one of which is arranged on each of the at least one balance beams, such that a drive mechanism varies the position of the sliding weight in a controlled way, based upon at least one of: a measurement variable of the measurement transducer and a position-measuring device cooperating with the measurement transducer.

2. The device of claim 1, wherein:
   the drive mechanism varies the position of the sliding weight to achieve at least one of: varying the position of a measurement window of the device, compensating a load acting on the load-receiving part, compensating a buoyant force of a load acting on the load-receiving part, and compensating, partially or totally, a sensitivity to rotary vibrations.

3. The device of claim 1, wherein:
   the electromagnetic coil of the measurement transducer is carried by the second lever arm and the permanent magnet is located on the stationary part;
   wherein the measurement variable used to set the position of the sliding weight is the coil current flowing through the electromagnetic coil to generate the compensation force.

4. The device of claim 1, wherein:
   the position-measuring device is an optoelectronic position sensor, comprising:
      a light emitter;
      a light receiver, the light emitter and receiver arranged to face each other across a space interval on the stationary part; and
      a shutter vane that cuts through the space interval and participates in the excursions of the movable parts of the device;
   an output signal of the position-measuring device corresponding to a displacement of the interconnected movable parts of the balance from a zero position which occurs as a result of placing the load on the load receiver, and the position sensor signal representing the measurement variable that controls the positioning of the sliding weight.

5. The device of claim 1, further comprising:
a travel-measuring device arranged to register the position of the sliding weight; and
a processor unit having a memory in which the position of the sliding weight registered by the travel-measuring device is stored for retrieval at a later point in time as at least one of: a position setting, a preload-compensation setting, a buoyancy-compensation setting and a compensation setting for rotatory vibrations.

6. The device of claim 5, further comprising:
a reader device, arranged on the load-receiving part or connected to the gravimetric measuring instrument, to read a bar code or an RFID chip and send a signal to the processor unit, which identifies a receptacle and recalls, for the receptacle that is identified, the stored data associated with at least one of: the position setting, the preload-compensation setting, the buoyancy-compensation setting and the rotatory-vibration compensation setting of the at least one sliding weight.

7. The device of claim 1, wherein:
the center of mass of the at least one sliding weight is positioned on a plane of neutral equilibrium and the sliding weight is constrained to move within the plane.

8. The device of claim 4, wherein:
at least two sliding weights are each arranged on the balance beam at a position within a plane of neutral equilibrium of the balance beam and move independently of each other within the plane.

9. The device of claim 8, wherein:
the at least two sliding weights differ from each other in their respective densities and/or are configured to be exchangeable.

10. The device of claim 1, wherein:
at least one sliding weight is arranged with sliding mobility on each of at least two balance beams.

11. The device of claim 1, wherein:
each of the at least one sliding weights is moved into position, and the travel distance thereof controlled, by a drive mechanism selected from the group consisting of: a linear drive mechanism, a piezoelectric drive source and a rotary drive mechanism with a spindle.

12. The device of claim 1, further comprising:
an electrical drive mechanism for positioning one of the at least one sliding weights, where the electrical drive mechanism is part of the sliding weight.

13. The device of claim 1, further comprising:
a further coupler element that attaches one of the at least one sliding weights to the balance beam for transferring weight in a unidirectional manner, such that the weight contributed by the sliding weight is operatively coupled and uncoupled.

14. The device of claim 1, wherein:
each of the at least one sliding weights is movable into a position where the weight thereof acts in opposition to the compensation force of the measurement transducer.

15. A method for operating a force-measuring device for a gravimetric measuring instrument according to claim 1, the method comprising the steps of:
determining a tare, by one of the following steps:
placing a tare load on the load-receiving part;
entering manually a weight value related to the tare load; or
identifying the tare load by using a reader device, arranged on the load-receiving part or connected to the gravimetric measuring instrument, from a bar code or an RFID chip;
establishing a setpoint value related to a measurement window of the device, by one of the following steps:
entering manually the setpoint value; or
retrieving a stored setpoint value from a memory of a processor unit in response to the selection of a weighing task by the user, and
moving each of the at least one sliding weights to a position determined by the setpoint value, using a drive mechanism.

16. The method of claim 15, wherein the force-measuring device has at least two sliding weights, the method further comprising the steps of:
moving, subsequent to the step of establishing a setpoint value, each of the at least two sliding weights to a position determined by the setpoint value, using a drive mechanism;
establishing a density value, by one of the following steps:
entering a density value of a weighing object as an additional input; or
registering a density value, from a bar code or an RFID chip, by means of a reader device that is arranged on the load-receiving part or connected to the gravimetric measuring instrument; and
adapting the respective positions of the at least two sliding weights to a position determined by the density value, independently of each other.

17. A method for operating a force-measuring device for a gravimetric measuring instrument according to claim 1 having at least two sliding weights, the method comprising the steps of:
determining a tare, by one of the following steps:
placing a tare load on the load-receiving part;
entering manually a weight value related to the tare load; or
identifying the tare load by using a reader device, arranged on the load-receiving part or connected to the gravimetric measuring instrument, from a bar code or an RFID chip;
establishing a setpoint value related to a measurement window of the device, by one of the following steps:
entering manually the setpoint value; or
retrieving a stored setpoint value from a memory of a processor unit in response to the selection of a weighing task by the user;
establishing a density value, by one of the following steps:
entering a density value of a weighing object as an additional input; or
registering a density value, from a bar code or an RFID chip, by means of a reader device that is arranged on the load-receiving part or connected to the gravimetric measuring instrument; and
moving each of the at least two sliding weights independently of each other to a position determined by the setpoint value and the density value, using a drive mechanism.

18. The method of claim 17, wherein the at least two sliding weights differ from each other in their respective densities and/or are configured to be exchangeable.

* * * * *

UNITED STATES PATENT AND TRADEMARK OFFICE
CERTIFICATE OF CORRECTION

PATENT NO.      : 9,360,362 B2
APPLICATION NO. : 13/946215
DATED           : June 7, 2016
INVENTOR(S)     : Metzger et al.

It is certified that error appears in the above-identified patent and that said Letters Patent is hereby corrected as shown below:

In the specification,

In column 3, line 24, please delete "element mer," and insert -- element, --.

Signed and Sealed this
Twenty-third Day of August, 2016

Michelle K. Lee
*Director of the United States Patent and Trademark Office*